US008640702B2

(12) United States Patent
Cannon

(10) Patent No.: US 8,640,702 B2
(45) Date of Patent: Feb. 4, 2014

(54) SYSTEM FOR REGULATING THE DISPENSING OF COMMERCIAL AIRCRAFT PASSENGER OXYGEN SUPPLY

(75) Inventor: James C. Cannon, Overland Park, KS (US)

(73) Assignee: BE Intellectual Property, Inc., Wellington, FL (US)

(*) Notice: Subject to any disclaimer, the term of this patent is extended or adjusted under 35 U.S.C. 154(b) by 1225 days.

(21) Appl. No.: 12/144,527

(22) Filed: Jun. 23, 2008

(65) Prior Publication Data

US 2009/0314296 A1    Dec. 24, 2009

(51) Int. Cl.
| | |
|---|---|
| A62B 7/04 | (2006.01) |
| F16K 31/26 | (2006.01) |
| A01G 25/09 | (2006.01) |
| B60P 3/22 | (2006.01) |
| B60P 3/30 | (2006.01) |
| B60R 15/04 | (2006.01) |
| E01H 1/10 | (2006.01) |
| E01H 3/02 | (2006.01) |

(52) U.S. Cl.
USPC .................................. 128/204.29; 137/899.2

(58) Field of Classification Search
USPC ............ 128/204.18, 202.12, 202.22, 204.21, 128/204.22, 204.23, 200.24, 203.22, 128/203.25, 205.11, 205.13, 205.17, 128/205.25, 204.26; 244/118.5; 454/71, 76; 137/81.1, 899.2, 487
See application file for complete search history.

(56) References Cited

U.S. PATENT DOCUMENTS

| | | | | |
|---|---|---|---|---|
| 2,934,293 | A * | 4/1960 | Boehme et al. | 244/118.5 |
| 3,467,093 | A | 9/1969 | Hotz | |
| 4,651,728 | A * | 3/1987 | Gupta et al. | 128/201.28 |
| 4,909,247 | A | 3/1990 | Terrisse | |
| 5,007,421 | A | 4/1991 | Stewart | |
| 5,199,423 | A * | 4/1993 | Harral et al. | 128/202.26 |
| 5,265,597 | A | 11/1993 | Wallis | |
| 5,357,949 | A * | 10/1994 | Bertheau et al. | 128/204.29 |
| 5,603,315 | A * | 2/1997 | Sasso, Jr. | 128/204.18 |
| 5,791,982 | A * | 8/1998 | Curry et al. | 454/74 |
| 5,809,999 | A * | 9/1998 | Lang | 128/200.24 |
| 7,588,032 | B2 * | 9/2009 | Cannon | 128/205.14 |
| 2003/0196696 | A1 * | 10/2003 | Meckes et al. | 137/109 |

(Continued)

FOREIGN PATENT DOCUMENTS

| | | |
|---|---|---|
| FR | 2858560 A | 2/2005 |
| FR | 2894562 A | 6/2007 |
| JP | 2007501041 T | 1/2007 |
| WO | 2007118494 A | 10/2007 |

OTHER PUBLICATIONS

SAE Aerospace Information Report (SAE AIR825, rev. C), May 1999.
International Search Report issued Sep. 14, 2009, pp. 1-4.

(Continued)

Primary Examiner — Lynne Anderson
Assistant Examiner — Bradley Philips
(74) Attorney, Agent, or Firm — Fulwider Patton LLP

(57) ABSTRACT

The aircraft emergency oxygen supply system includes one or more sources of supplemental breathable oxygen, one or more inlet valves for one or more breathing devices, connected to the inlet valves, and one or more cabin air pressure transducers. A pressure controller controls the inlet valves in response to the one or more cabin air pressure transducers. One or more second pressure transducers may connected to conduits downstream of inlet valves to be monitored, and the pressure controller may also control operation of the inlet valves in response to the one or more second pressure transducers.

3 Claims, 6 Drawing Sheets

(56) References Cited

U.S. PATENT DOCUMENTS

2006/0118115 A1* 6/2006 Cannon .................. 128/204.26
2006/0243859 A1* 11/2006 Lessi et al. ................ 244/118.5
2007/0144597 A1* 6/2007 Cazenave et al. .......... 137/899.2
2008/0053541 A1* 3/2008 Meckes et al. ........... 137/624.27
2009/0165802 A1* 7/2009 Farajallah ................ 128/205.24

OTHER PUBLICATIONS

Japanese Office Action, Sep. 11, 2012, 2 pages.

* cited by examiner

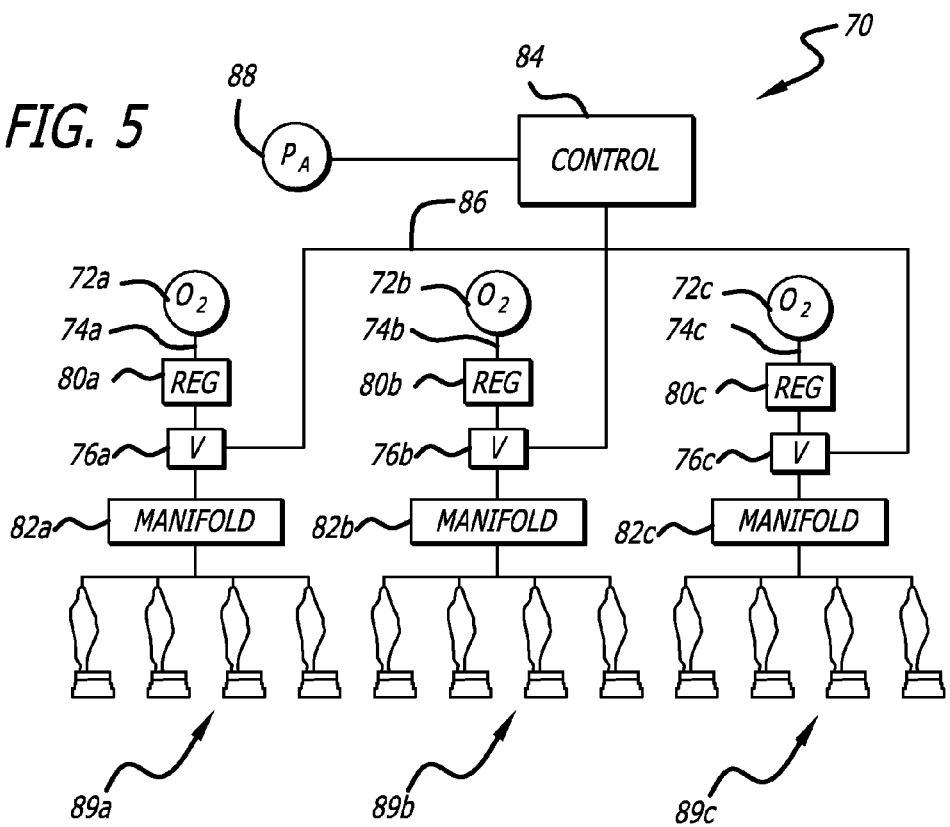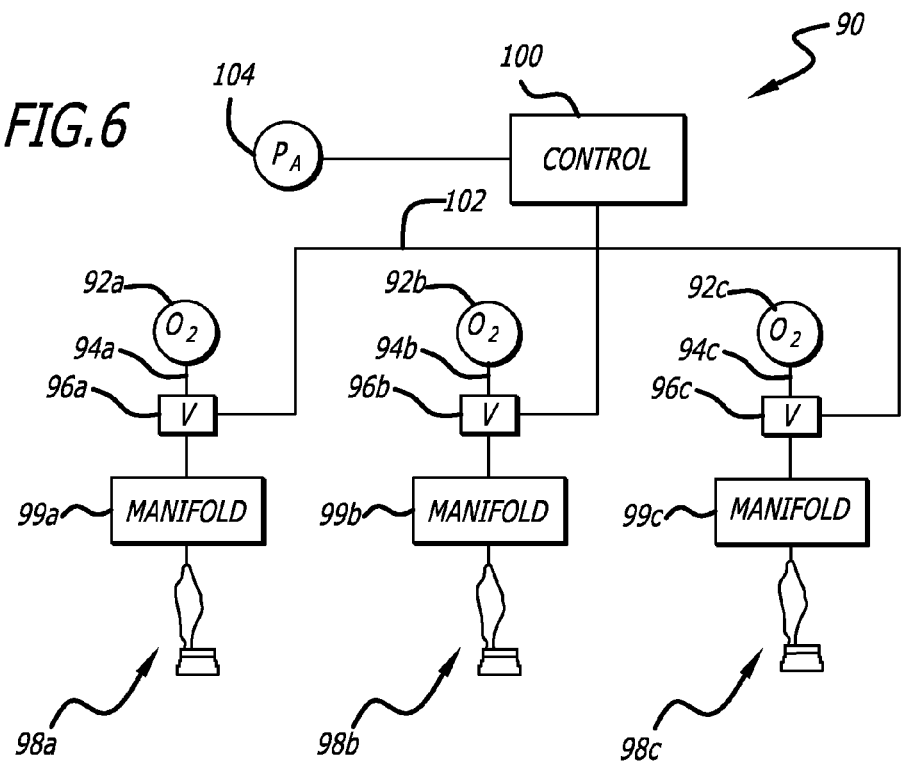

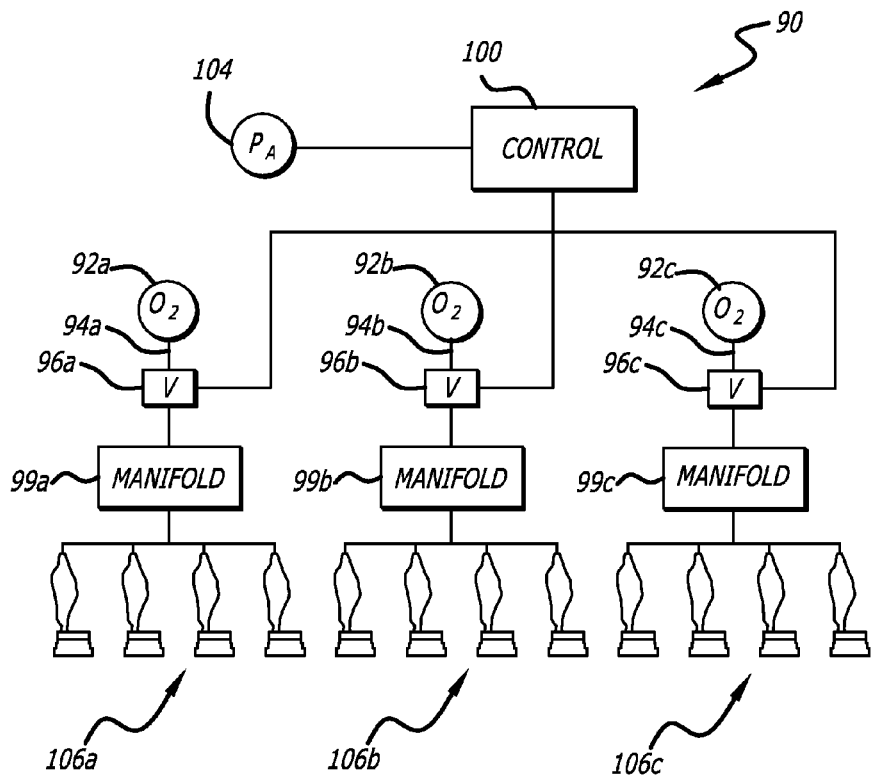
FIG. 7
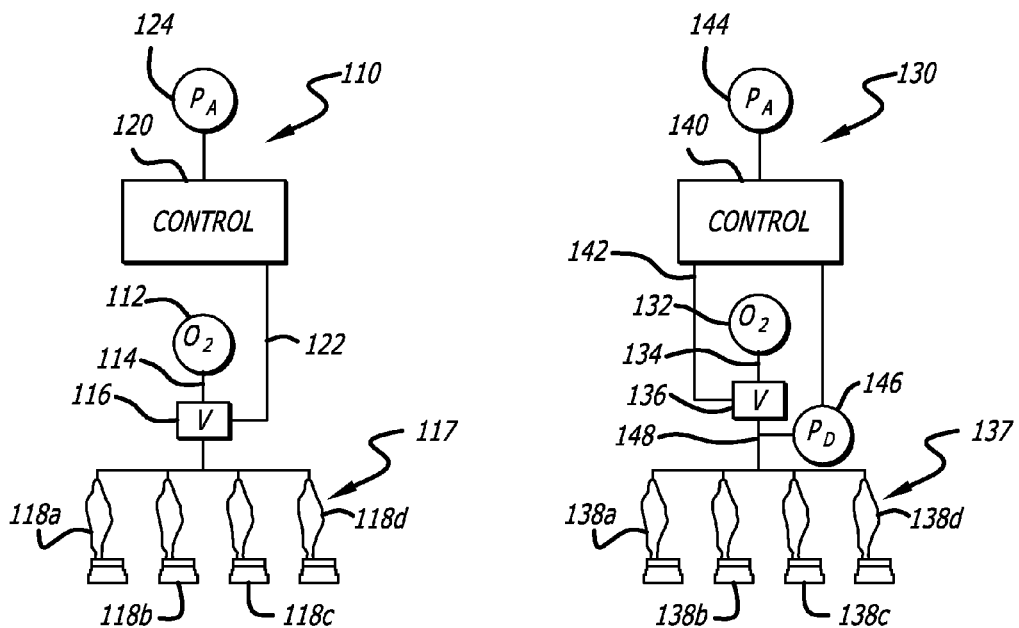
FIG. 8                    FIG. 9

SYSTEM FOR REGULATING THE DISPENSING OF COMMERCIAL AIRCRAFT PASSENGER OXYGEN SUPPLY

BACKGROUND OF THE INVENTION

This invention relates to the metering and control of fluids, and more particularly relates to the metering and control of fluids of aircraft passenger supplemental oxygen, particularly as would be used in a commercial aircraft airliner.

Emergency oxygen supply systems, such as are typically installed on aircraft to supply oxygen to passengers upon loss of cabin pressure at altitudes above about 12,000 feet, typically include a source of supplemental breathable oxygen connected to a face mask that is released from an overhead storage compartment when needed. The flow of breathable oxygen should be sufficient to sustain passengers until cabin pressure is re-established, or until a lower, safer altitude can be reached.

Presently, in passenger oxygen systems of large aircraft utilizing a gaseous oxygen supply source, oxygen is typically distributed from a centrally located bank of storage vessels or cylinders by a network of piping to manifolds that are commonly located adjacent to each row of seats. Each passenger mask is typically supplied via a separate orifice of the manifold. By varying the input pressure to the manifolds, the flow of oxygen to each of the masks can be varied.

When the emergency oxygen is to be supplied to a face mask, a constant flow of oxygen is typically received by a reservoir bag attached to the face mask. The oxygen is commonly supplied continuously at a rate that is calculated to accommodate even the needs of a passenger with a significantly larger than average tidal volume who is breathing at a faster than average respiration rate. The continuing flow of oxygen into the reservoir bag and into the mask is typically diluted by cabin air.

Inefficiencies in aircraft emergency oxygen supply systems can require the emergency oxygen supply to be larger and heavier than necessary, which has an adverse impact on the payload capacity and fuel consumption of the aircraft. For example, one known aircraft emergency oxygen supply system delivers a fixed oxygen flow suitable for the maximum cabin altitude contemplated, regardless of the actual cabin altitude that prevails. While this is a safe approach, it results in high oxygen consumption that requires a large and heavy oxygen supply.

Enhancing the efficiency of such aircraft emergency oxygen supply systems either in terms of the generation, storage, distribution or consumption of oxygen could therefore yield a weight savings. Conversely, an enhancement of an aircraft emergency oxygen supply system's efficiency without a commensurate downsizing would impart a larger margin of safety in the system's operation. It is therefore highly desirable to enhance the efficiency of an emergency oxygen supply system in any way possible.

The delivered supplemental oxygen flow rate needed to properly oxygenate an aircraft cabin occupant depends on the prevailing pressure altitude. The quantity of oxygen delivered to a user can advantageously be varied as a function of altitude, so that the quantity delivered produces proper oxygenation, while avoiding an inefficient and wasteful delivery of a greater quantity of oxygen than is required.

While efficient delivery of oxygen to each cabin occupant at the minimum required flow rate for a given altitude is desirable, variations in oxygen delivery to various masks distributed about the cabin due to variations in the pressure drop between locations in the piping system can result in some oxygen masks receiving oxygen flow at a lower rate than the average rate of oxygen flow. Because the system design is required to ensure that even the least favored mask must receive a sufficient supply, it follows that more oxygen than the minimum amount required to suitably oxygenate the user of a mask can be delivered to a mask receiving an average oxygen flow. Delivery of an average excess oxygen to masks to compensate for pressure variations within the distribution system constitutes a second inefficiency in the delivery of oxygen.

One conventional response to the issue of altitude variations has been the use of a so-called "altitude compensating regulator." In a typical altitude compensating regulator, an aneroid barometer adjusts the output pressure of the regulator in response to changes in pressure altitude within the cabin. However, altitude compensating regulators often deliver an optimum flow at one altitude range and greater-than-optimum flow at other altitudes, as a consequence of the operating principles and control laws that govern the performance of pneumatic oxygen regulators. Further, a centrally located altitude compensating regulator fails to address the differences in flow rates at various locations in the piping network that result from variations in pressure drops within different regions of the piping network.

A disadvantage of a conventional electronic altitude compensating regulator is that the controller must be capable of generating signals that can move the valve to a multiplicity of positions, adding to complexity and cost. The valve also must have features that render it capable of responding by adopting a multiplicity of positions. Furthermore, the use of a single electronic regulator does not address the issue of different flows being delivered at different locations in the aircraft due to the varied pressure drops in the distribution lines.

One conventional aircraft emergency oxygen supply system utilizes an electrically operated valve that is capable of assuming a multiplicity of states between fully open and fully closed. This approach allows the aircraft emergency oxygen supply system to operate more efficiently at a range of altitudes, but utilizes a valve that is complex in its principle of operation and its performance, and that is therefore expensive and difficult to design and manufacture.

Another conventional aircraft emergency oxygen supply system supplies passengers with a first fraction of air enriched in oxygen from high pressure oxygen cylinders during a descent phase of the aircraft between a normal cruising altitude and an intermediate rerouting altitude. Compressed air is taken from a source of compressed air in the aircraft to produce a second fraction of air enriched in oxygen delivered to passengers during a phase of stabilized flight of the aircraft greater than 5,500 meters.

Another conventional aircraft emergency oxygen supply system calculates oxygen required and monitors the oxygen supply and flight level after emergency cabin decompression. The system utilizes a pressurized oxygen supply which feeds oxygen into the interior of the plane when it flies at high cabin altitudes, and the system indicates the changing status of the supply as oxygen is drained from the system. The system includes a pressure transducer coupled to the supply, and determines the rate at which the pressure of the supply is reduced, to yield a first signal representing this pressure lapse rate, and to concurrently determine the lapse rate at which the number of liters of oxygen in the supply is reduced, to yield a second signal representing the liter lapse rate. When oxygen is being drained from the supply, the system calculates the prevailing supply pressure, the number of liters remaining in the supply, and the time in hours and minutes remaining before the supply is exhausted, based on the current rate of oxygen consumption.

Another known aircraft emergency oxygen supply system includes pressurized oxygen storage for feeding a pipe with pressurized oxygen, and a distribution unit that responds to loss of pressurization at high altitude. The distribution unit delivers pressurized oxygen at a pressure that increases up to a first value that is reached when loss of pressurization occurs under an altitude of about 40,000 feet, and delivers pressurized oxygen at a pressure at a second value of about two times the first value, at an altitude above about 40,000 feet.

It would be desirable to provide an aircraft emergency oxygen supply system utilizing a simple electrically operated valve having on and off positions in combination with one or more suitable pressure transducers and suitable control logic to supply oxygen in a manner that is adjusted in response to the prevailing cabin altitude, to ensure that sufficient supplemental oxygen is dispensed for the particular cabin altitude condition that prevails, without dispensing more oxygen than is needed under the altitude condition, and to minimize the weight of the associated oxygen supply. It would also be desirable to provide an aircraft emergency oxygen supply system that efficiently uses multiple control zones within an aircraft, as well as multiple oxygen storage sources that are distributed through the aircraft. The present invention satisfies these and other needs.

SUMMARY OF THE INVENTION

Briefly, and in general terms, the invention provides for an aircraft emergency oxygen supply system utilizing an electrically operated on-off inlet valve in combination with one or more suitable pressure transducers and one or more suitable controllers to supply supplemental oxygen as needed at a prevailing cabin altitude, without dispensing more oxygen than is needed, minimizing the weight of the oxygen supply, and allowing efficient use of multiple control zones and oxygen sources within an aircraft.

Accordingly, the present invention provides for an aircraft emergency oxygen supply system including one or more sources of supplemental breathable oxygen, each connected to a corresponding inlet valve. In one aspect, the inlet valves are on-off inlet valves, such as two-position solenoid valves. One or more breathing devices are connected to each inlet valve, and one or more cabin air pressure transducers are provided for generating a cabin air pressure input signal representing the cabin pressure and a corresponding altitude. A pressure controller is connected to the inlet valves and is configured to control the operation of the inlet valves in response to the input signals received from the one or more cabin air pressure transducers. This arrangement allows for a zoned-system architecture, with one or more pressure controllers and their corresponding sources of supplemental breathable oxygen, inlet valves, breathing devices and cabin air pressure transducers placed in various locations within the aircraft. In another aspect, the inlet valves may include an upstream first inlet valve, and a downstream second inlet valve connected downstream to the first inlet valve, and the one or more breathing devices are connected to the downstream second inlet valve.

In another aspect, the invention provides for an aircraft emergency oxygen supply system that includes a plurality of sources of supplemental breathable oxygen, a corresponding plurality of inlet valves connected to the plurality of sources of supplemental breathable oxygen, respectively, a corresponding plurality of breathing devices connected to the plurality of inlet valves, respectively, and one or more pressure controllers connected to the plurality of inlet valves and configured to control the operation of the plurality of inlet valves. A plurality of conduits may be connected between the plurality of sources of supplemental breathable oxygen and the corresponding plurality of inlet valves, respectively, to provide a flow of oxygen to the plurality of inlet valves. In another presently preferred aspect, the inlet valves may include a corresponding plurality of upstream first on-off inlet valves, respectively, and a corresponding plurality of downstream second on-off inlet valves, respectively, connected downstream serially to the plurality of first on-off inlet valves, respectively, and the plurality of breathing devices are connected to the corresponding plurality of downstream second on-off inlet valves, respectively.

In one presently preferred aspect, the one or more cabin air pressure transducers may be configured to generate a cabin air pressure input signal representing a cabin pressure and a corresponding altitude. In another presently preferred aspect, one or more second pressure transducers also may be connected to one of the conduits at a location downstream of one of the inlet valves to be monitored, to generate a gas pressure input signal representing a gas pressure downstream of the monitored valve. The one or more pressure controllers control the operation of the inlet valves in response to the first input signal received from the first pressure transducer representing the cabin pressure and a corresponding altitude, and in response to the second input signal received from the second pressure transducer. The one or more second pressure transducers may include a plurality of second pressure transducers connected to the conduits downstream from the upstream first on-off inlet valves, respectively, and a plurality of third pressure transducers connected to the conduits downstream from the downstream second on-off valves, respectively, representing a gas pressure downstream of the monitored valves, in which case the one or more pressure controllers control the operation of the inlet valves in response to the first input signal received from the first pressure transducer representing the cabin pressure and a corresponding altitude, and in response to the plurality of second pressure transducers and the plurality of third pressure transducers. The one or more pressure controllers compare a measured pressure downstream with a desired delivery pressure, and if the measured downstream pressure is greater than or equal to the desired delivery pressure, the one or more pressure controllers are operative to close the inlet valves, and if the measured downstream pressure is lower than the desired delivery pressure, the one or more pressure controllers are operative to momentarily open the inlet valves.

In another presently preferred aspect, the emergency oxygen supply system further includes one or more manifolds connected between one or more inlet valves and one or more breathing devices, respectively. In another presently preferred aspect, the emergency oxygen supply system may further include a corresponding plurality of pressure reducing regulators connected to the plurality of sources of supplemental breathable oxygen, respectively. In another aspect, the plurality of pressure reducing regulators include no altitude-compensating features.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 5 is a schematic diagram of a variation of the fourth embodiment of FIG. 4.

FIG. 6 is a schematic diagram of a fifth embodiment of the system for regulating the dispensing of commercial aircraft passenger oxygen supply, according to the present invention.

FIG. 7 is a schematic diagram of a variation of the fifth embodiment of FIG. 6.

FIG. 8 is a schematic diagram of a sixth embodiment of the system for regulating the dispensing of commercial aircraft passenger oxygen supply, according to the present invention.

FIG. 9 is a schematic diagram of a seventh embodiment of the system for regulating the dispensing of commercial aircraft passenger oxygen supply, according to the present invention.

DETAILED DESCRIPTION OF THE PREFERRED EMBODIMENTS

Figure 1:
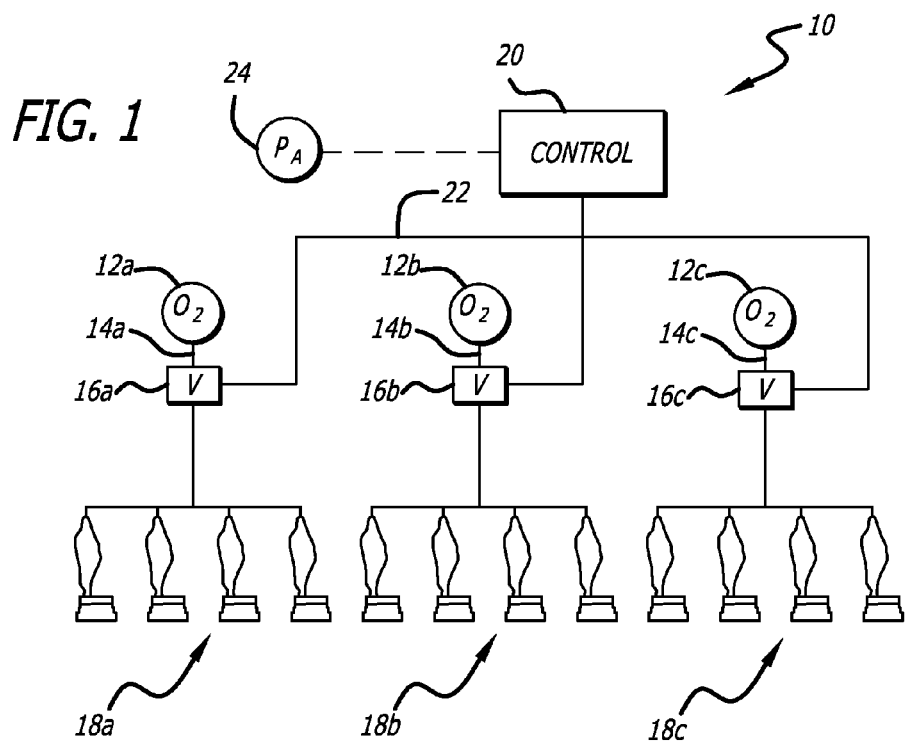
FIG. 1 is a schematic diagram of a first embodiment of the system for regulating the dispensing of commercial aircraft passenger oxygen supply, according to the present invention.

Referring to the drawings, which are provided for purposes of illustration and by way of example, the present invention provides for an aircraft emergency oxygen supply system utilizing an electrically operated on-off inlet valve in combination with one or more suitable pressure transducers and one or more pressure controllers to supply supplemental oxygen appropriate for the prevailing cabin altitude, without dispensing more oxygen than is needed, minimizing the weight of the oxygen supply, and allowing efficient use of multiple control zones and oxygen sources within an aircraft.

In a first preferred embodiment of the emergency oxygen supply system 10 of the present invention, illustrated in FIG. 1, a plurality of sources of supplemental breathable oxygen 12a, 12b, 12c, such as a plurality of cylinders of compressed oxygen, for example, store a required supply of oxygen. Corresponding conduits 14a, 14b, 14c are connected to the plurality of sources of supplemental breathable oxygen, respectively, to provide a flow of oxygen, controlled by corresponding relatively simple on-off inlet valves 16a, 16b, 16c, respectively, to corresponding sets of breathing devices 18a, 18b, 18c typically including one or more individual reservoir bags and attached face masks, respectively. In one presently preferred aspect, the inlet valves are located in proximity to the corresponding plurality of sources of supplemental breathable oxygen. At least one pressure controller 20 is connected to the inlet valves and controls the operation of the inlet valves via a network of control lines 22, in response to an input signal received from a single cabin air pressure transducer $P_A$ (24) representing the cabin pressure and a corresponding altitude. This configuration results in a system that is lighter than one without altitude compensation, and simpler than one that uses conventional altitude compensation with a multiplicity of complex regulators.

Figure 2:
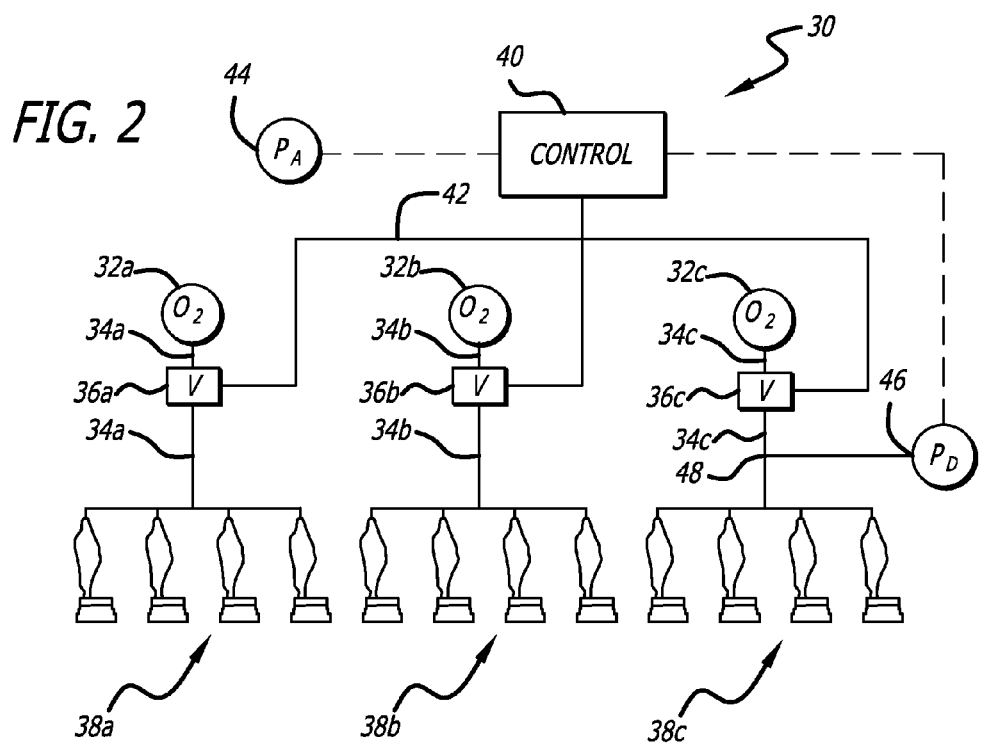
FIG. 2 is a schematic diagram of a second embodiment of the system for regulating the dispensing of commercial aircraft passenger oxygen supply, according to the present invention.

In a second embodiment of the invention illustrated in FIG. 2, an emergency oxygen supply system 30 includes a plurality of sources of supplemental breathable oxygen 32a, 32b, 32c, such as a plurality of cylinders of compressed oxygen, for example, that store a required supply of oxygen. Corresponding conduits 34a, 34b, 34c are connected to the plurality of sources of supplemental breathable oxygen, respectively, to provide a flow of oxygen, controlled by corresponding relatively simple on-off inlet valves 36a, 36b, 36c, respectively, such as two-position solenoid valves, for example, to corresponding sets of breathing devices 38a, 38b, 38c, typically including one or more individual reservoir bags and attached face masks, respectively. In one presently preferred aspect, the inlet valves are located in proximity to the corresponding plurality of sources of supplemental breathable oxygen. At least one pressure controller, such as the pressure controller 40, is connected to the inlet valves and controls the operation of the inlet valves via a network of control lines 42 in response to a first input signal received from a first pressure transducer $P_A$ (44) representing the cabin pressure and a corresponding altitude, and in response to a second input signal received from a second pressure transducer $P_D$ (46) connected to one of the conduits at a location 48 downstream of one of the inlet valves to be monitored, representing the current gas pressure downstream of the monitored valve. From the input from the downstream pressure transducer $P_D$, the controller compares a current gas pressure downstream ($P_D$) with a desired delivery pressure. If the current downstream pressure is greater than or equal to the desired delivery pressure, the inlet valves remain closed. If the downstream pressure is lower than desired, the controller momentarily opens the valves, releasing added oxygen into the downstream portion of the oxygen distribution system and raising the downstream pressure.

Within this embodiment, the valves could be opened for an interval that is constant for each opening event, and the delivery would then be controlled solely by adjusting the duration of the time between pulses. Alternatively, both the length of the opening interval and the duration of the closed time between intervals could be each adjusted to achieve the overall result.

Since oxygen flows out of the system through the breathing devices, the pressure at the point where the downstream pressure is measured would vary somewhat as a function of time, dropping continuously when the valves are closed and increasing continuously when the valves are opened. The magnitude of the contained volume of the system downstream, relative to the volume rate of flow out of the system, would affect the magnitude of such variations. By suitably varying the time scale of the on and off intervals, the output pressure can be adjusted to suitably approximate a steady state.

Many oxygen systems for aircraft passengers utilize as the oxygen dispensing device the type of constant flow oxygen mask that is known as a "phase dilution mask." Such masks are contemplated by SAE Aerospace Standard AS8025. The mask has a reservoir that collects oxygen delivered during the portions of the breathing cycle when the user is exhaling and during the pause between breaths, and this collected oxygen is then delivered at the beginning of the next inhalation. If the time scale of the variation in delivery pressure is short relative to the time scale of the breathing cycle, the output pressure would be considered to be approximating a steady state in a manner suitable for the purpose of supplying such a mask.

Thus, in the second embodiment of the invention, a simple inlet valve such as a two position solenoid valve can replace a more complicated and costly control valve. In association with this change in valve type, the controller is also correspondingly simpler because it is only required to generate a simple "on" or "off" signal.

Figure 3:
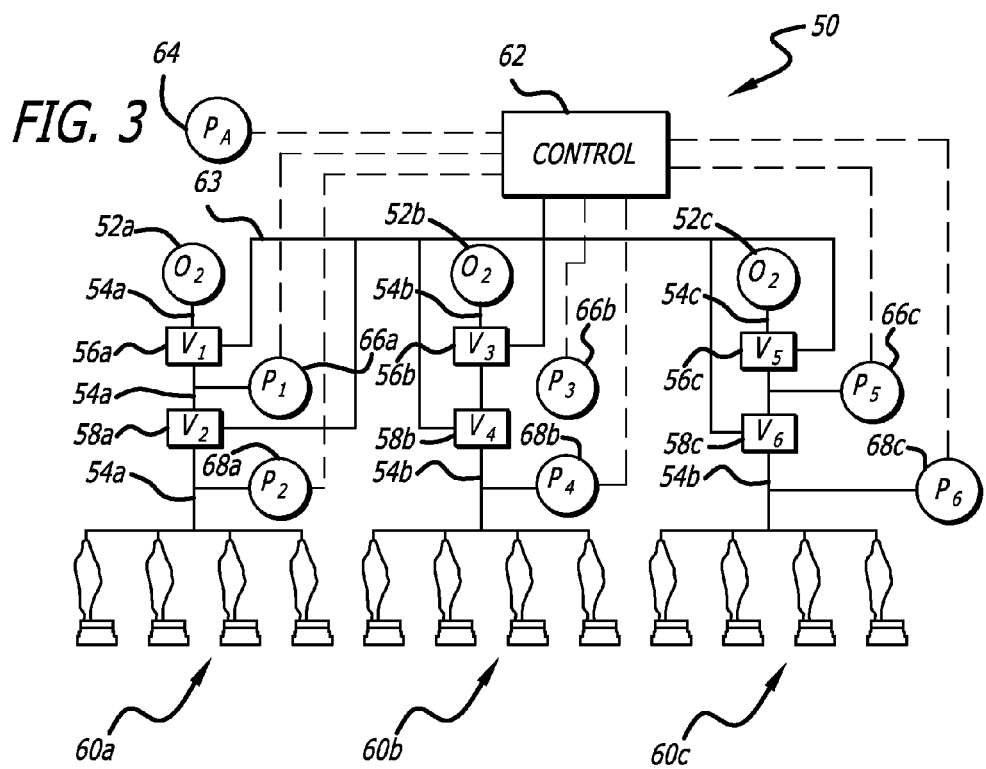
FIG. 3 is a schematic diagram of a third embodiment of the system for regulating the dispensing of commercial aircraft passenger oxygen supply, according to the present invention.

In a third embodiment of the invention illustrated in FIG. 3, multiple simple inlet valves are placed at various locations within the oxygen distribution piping system, with a pressure transducer downstream of each valve. In this embodiment, the emergency oxygen supply system 50 includes a plurality of sources of supplemental breathable oxygen 52a, 52b, 52c, such as a plurality of cylinders of compressed oxygen, for example, that store a required supply of oxygen. Corresponding conduits 54a, 54b, 54c are connected to the plurality of sources of supplemental breathable oxygen, respectively, to provide a flow of oxygen, controlled by corresponding first relatively simple upstream on-off inlet valves $V_1$ (56a), $V_3$ (56b), $V_5$ (56c), respectively, and corresponding second relatively simple downstream on-off inlet valves $V_2$ (58a), $V_4$ (58b), $V_6$ (58c), respectively, such as two-position solenoid valves, for example, connected serially to corresponding sets of breathing devices 60a, 60b, 60c, each typically including one or more individual reservoir bags and attached face masks, respectively. At least one pressure controller, such as a single pressure controller 62, is connected to the inlet valves and controls the operation of the inlet valves via a network of control lines 63 in response to input signals received from a first pressure transducer $P_A$ (64), representing the cabin pressure and a corresponding altitude, and input signals received from a plurality of second pressure transducers $P_1$ (66a), $P_3$ (66b), $P_5$ (66c), downstream from the upstream on-off valves $V_1$, $V_3$, $V_5$, respectively, and input signals received from a plurality of second pressure transducers $P_2$ (68a), $P_4$ (68b), $P_6$ (68c), downstream from the downstream on-off valves $V_2$, $V_4$, $V_6$, respectively, representing the current gas pressure downstream of the monitored valves. Each valve and associated pressure transducer set is connected to the controller by a separate set of wires. The controller may have multiple independent channels, so that each valve and associated pressure transducer has a dedicated control channel. Alternatively, the pressure controller could be sequenced so that the signal from one downstream pressure transducer at a time is read, and its associated valve is pulsed if the pressure value detected is low enough to require this action.

In this embodiment, oxygen delivery pressure can be set to an optimum value zone by zone, without performance being limited by the differences in flow rates at various locations in the piping network that result from variations in pressure drops within different regions of the piping network.

Figure 4:
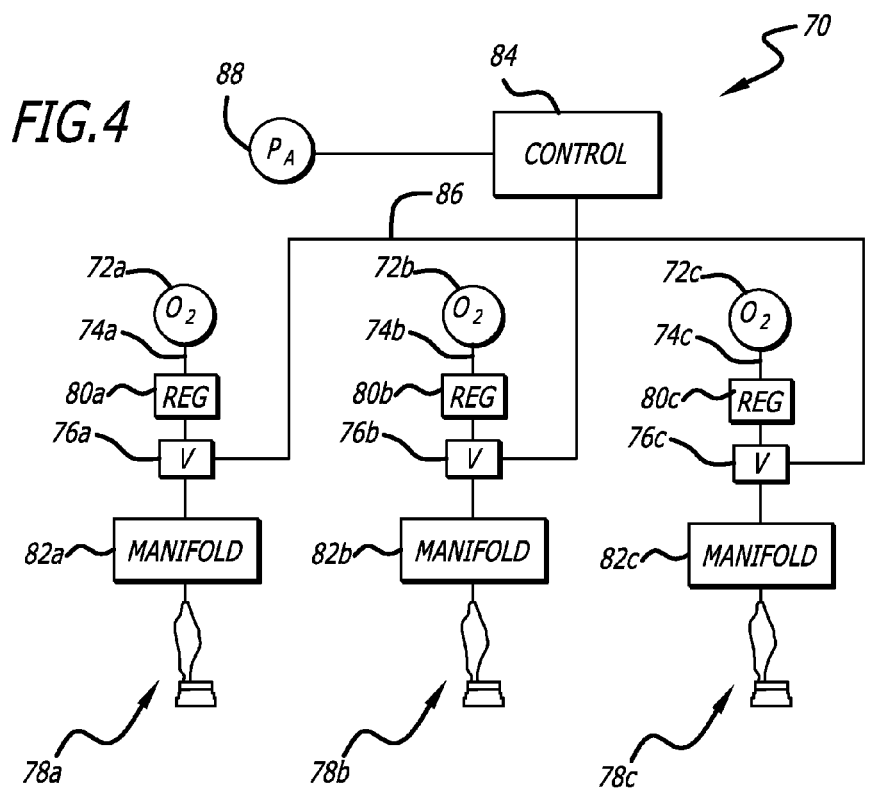
FIG. 4 is a schematic diagram of a fourth embodiment of the system for regulating the dispensing of commercial aircraft passenger oxygen supply, according to the present invention.

In a fourth embodiment of the invention, illustrated in FIG. 4, an emergency oxygen supply system 70 includes a plurality of sources of supplemental breathable oxygen 72a, 72b, 72c, such as a very large number of separate, relatively small oxygen cylinders that are distributed throughout the airplane. In the limiting case of such an approach, each cabin occupant may be served by a separate one-person cylinder. Corresponding conduits 74a, 74b, 74c are connected to the plurality of sources of supplemental breathable oxygen, respectively, to provide a flow of oxygen, controlled by corresponding relatively simple on-off inlet valves 76a, 76b, 76c, respectively, such as two-position solenoid valves, for example, to corresponding individual breathing devices 78a, 78b, 78c typically including one or more individual reservoir bags and attached face masks, respectively. Since the piping between the small cylinders and the few breathing devices supplied with oxygen would be relatively simple, the pressure drops would all be essentially equal, so there would be little or no need to deliver excess oxygen to the average breathing device in a given zone in order to ensure the least favored breathing device in the zone is not under-supplied. Each oxygen vessel is fitted with a simple pressure reducing regulator 80a, 80b, 80c, respectively, with no altitude-compensating features included. In such an approach to oxygen system design that uses many small, separate cylinders, the controller should be very capable, either equipped with a very large number of simultaneously operating separate channels or capable of managing a very large number of signals in rapid sequence. Downstream of each valve, a manifold 82a, 82b, 82c, fitted with one or more dispensing orifices, is interposed between the corresponding valve and its associated reservoir bag, respectively. Each manifold orifice supplies one breathing device. If there are two or more dispensing orifices present, the oxygen manifold is configured such that all of these dispensing orifices experience the same upstream oxygen pressure.

At least one pressure controller, such as a single pressure controller 84, is connected to and controls the operation of the inlet valves via a network of control lines 86 in response to a first input signal received from a single pressure transducer $P_A$ (88), representing the cabin pressure and a corresponding altitude. The controller evaluates the pressure transducer signal and generates a single signal to all of the simple inlet valves. In this case, there is an intrinsic flow rate that would be achieved through each dispensing orifice if the simple inlet valves were continuously open. This intrinsic flow rate is a function of the output pressure from the pressure reducer and the properties of the dispensing orifices. Depending on the flow that is appropriate for the given altitude, the valve-operating signal is applied for a suitable fraction of the operating time. The flow rate achieved by each dispensing orifice is then equal to the intrinsic flow rate possible multiplied by the fraction of time the valve is open. For example, if the intrinsic flow rate possible when the valve is open continuously is 4 liters per minute and the valve is open 30% of the time, the flow rate achieved is 1.2 liters per minute.

As is illustrated in FIG. 5, in a variation of the fourth embodiment, in which the same elements from FIG. 4 are indicated by the same reference numbers as in FIG. 4, more than one cabin occupant may be served by each oxygen supply cylinder. Corresponding conduits 74a, 74b, 74c are connected to the plurality of sources of supplemental breathable oxygen, respectively, to provide a flow of oxygen, controlled by corresponding relatively simple on-off inlet valves 76a, 76b, 76c, respectively, such as two-position solenoid valves, for example, to corresponding sets of a plurality of breathing devices 89a, 89b, 89c, each typically including one or more individual reservoir bags and attached face masks, respectively. Each oxygen vessel is fitted with a simple pressure reducing regulator 80a, 80b, 80c, respectively, with no altitude-compensating features included. Downstream of each valve, a manifold 82a, 82b, 82c, fitted with one or more dispensing orifices, is interposed between the corresponding valve and its associated reservoir bag, respectively. Each manifold orifice supplies more than one breathing device. At least one pressure controller, such as a single pressure controller 84, is connected to the inlet valves and controls the operation of the inlet valves via a network of control lines 86 in response to a first input signal received from a single pressure transducer $P_A$ (88), representing the cabin pressure and a corresponding altitude.

In a fifth embodiment of the invention, illustrated in FIG. 6, an emergency oxygen supply system 90 includes a plurality of sources of supplemental breathable oxygen 92a, 92b, 92c, such as a very large number of separate, relatively small oxygen cylinders distributed throughout the airplane. As is shown in FIG. 6, each cabin occupant may be served by a separate one-person cylinder, although more than one person may be served by each oxygen supply cylinder, as is further described below. Corresponding conduits 94a, 94b, 94c are connected to the plurality of sources of supplemental breathable oxygen, respectively, to provide a flow of oxygen, controlled by corresponding relatively simple on-off inlet valves 96a, 96b, 96c, respectively, such as two-position solenoid valves, for example, to corresponding individual breathing devices 98a, 98b, 98c typically including one or more individual reservoir bags and attached face masks, respectively. In this embodiment, a pressure reducer at the outlet of the local oxygen vessel is eliminated. Since the piping between the small cylinders and the few breathing devices supplied with oxygen would be relatively simple, the pressure drops would all be essentially equal, so there would be little or no need to deliver excess oxygen to the average breathing device in a given zone in order to ensure the least favored breathing device in the zone is not under-supplied. Downstream of each inlet valve, a manifold 99a, 99b, 99c, fitted with one or more dispensing orifices, is interposed between the corresponding inlet valve and its associated reservoir bag, respectively. As is shown in FIG. 6, each manifold orifice supplies one breathing device, although each manifold may supply more than one breathing device, as is described below. If there are two or more dispensing orifices present, the oxygen manifold is configured such that all of these dispensing orifices experience the same upstream oxygen pressure.

At least one pressure controller, such as a single pressure controller 100, is connected to the inlet valves and controls the operation of the inlet valves via a network of control lines 102 in response to a first input signal received from a single pressure transducer $P_A$ (104), representing the cabin pressure and a corresponding altitude. The controller evaluates the pressure transducer signal and generates a single signal to all of the simple inlet valves. In this case, there is an intrinsic flow rate that would be achieved through each dispensing orifice if the simple inlet valves were continuously open. This intrinsic flow rate is a function of the output pressure from the pressure reducer and the properties of the dispensing orifices. Depending on the flow that is appropriate for the given altitude, the valve-operating signal is applied for a suitable fraction of the operating time. The flow rate achieved by each dispensing orifice is then equal to the intrinsic flow rate possible multiplied by the fraction of time the inlet valve is open. For example, if the intrinsic flow rate possible when the valve is open continuously is 4 liters per minute and the valve is open 30% of the time, the flow rate achieved is 1.2 liters per minute.

As is illustrated in FIG. 7, in a variation of the fifth embodiment, in which the same elements from FIG. 6 are indicated by the same reference numbers as in FIG. 6, more than one cabin occupant may be served by each oxygen supply cylinder. Corresponding conduits 94a, 94b, 94c are connected to the plurality of sources of supplemental breathable oxygen, respectively, to provide a flow of oxygen, controlled by corresponding relatively simple on-off inlet valves 96a, 96b, 96c, respectively, such as two-position solenoid valves, for example, to corresponding sets of breathing devices 106a, 106b, 106c, each typically including one or more individual reservoir bags and attached face masks, respectively. Downstream of each inlet valve, a manifold 99a, 99b, 99c, fitted with one or more dispensing orifices, is interposed between the corresponding inlet valve and its associated reservoir bag, respectively. Each manifold orifice supplies more than one breathing device, and each oxygen manifold is configured such that all of its dispensing orifices experience the same upstream oxygen pressure. At least one pressure controller, such as a single pressure controller 100, is connected to the inlet valves and controls the operation of the inlet valves via a network of control lines 102 in response to a first input signal received from a single pressure transducer $P_A$ (104) representing the cabin pressure and a corresponding altitude. Interposed between each oxygen vessel and its associated manifold containing the dispensing orifices, a simple electrical inlet valve is installed. An intrinsic flow rate can be achieved at any given point in time through each dispensing orifice when the simple inlet valve is open continuously. However, this flow rate changes as the pressure in the oxygen storage vessel upstream of the dispensing orifice decays with the passage of time during operation of the equipment. The flow rate is a function of the operating time history and the pressure decay properties of the oxygen storage units, as well as the properties of the dispensing orifices themselves. In this context, the "operating time" refers to the time the inlet valve remains open, which is not necessarily equal to the total elapsed time since the beginning of a decompression incident causing supplemental oxygen to be used.

In the fifth embodiment, a single pressure transducer senses the cabin pressure altitude. The controller contains information that mathematically describes the way in which the pressure in the oxygen storage vessel decays as a function of operating time. The controller also measures and retains information about the operating time history during the period of use. The controller evaluates the pressure transducer signal and the operating time history and generates a single signal to all of the simple inlet valves. Depending on the flow that is appropriate for the combination of given altitude and given previous operating time history, the valve-operating signal is applied for a suitable fraction of the operating time. The flow rate achieved by each dispensing orifice is then equal to the intrinsic flow rate possible multiplied by the fraction of time the inlet valve is open. While this embodiment requires greater calculating capabilities in the controller, it eliminates a large number of pressure reducing regulators as well as a large number of pressure transducers and their wiring.

In a sixth preferred embodiment of the emergency oxygen supply system 110 of the present invention, illustrated in FIG. 8, a source of supplemental breathable oxygen 112, such as one or more cylinders of compressed oxygen, for example, serves to store a required supply of oxygen. A corresponding conduit 114 is connected to the source of supplemental breathable oxygen to provide a flow of oxygen, controlled by a relatively simple on-off inlet valve 116, to a set 117 of one or more breathing devices 118a, 118b, 118c, 118d, typically including one or more individual reservoir bags and attached face masks, respectively. In one presently preferred aspect, the inlet valve is located in proximity to the source of supplemental breathable oxygen. A single pressure controller 120 is connected to and controls the operation of the inlet valve via control line 122 in response to an input signal received from a single cabin air pressure transducer $P_A$ (124), representing the cabin pressure and a corresponding altitude. This configuration results in a system that is lighter than one without altitude compensation, and simpler than one that uses conventional altitude compensation with a multiplicity of complex regulators. This configuration also allows for a zoned-system architecture, with one or more pressure controllers and their corresponding sources of supplemental breathable oxygen, inlet valves, breathing devices and cabin air pressure transducers placed in various locations within the aircraft.

In a seventh embodiment of the invention illustrated in FIG. 9, an emergency oxygen supply system 130 includes a source of supplemental breathable oxygen 132, such as one or more cylinders of compressed oxygen, for example, to store a required supply of oxygen. A conduit 134 is connected to the source of supplemental breathable oxygen to provide a flow of oxygen, controlled by a relatively simple on-off inlet valve 136, such as a two-position solenoid valve, for example, to a corresponding set 137 of breathing devices 138a, 138b, 138c, 138d, typically including one or more individual reservoir bags and attached face masks, respectively. In one presently preferred aspect, the inlet valve is located in proximity to the source of supplemental breathable oxygen. A single pressure controller 140 is connected to and controls the operation of the inlet valve via a control line 142 in response to a first input signal received from a first pressure transducer $P_A$ (144), representing the cabin pressure and a corresponding altitude, and in response to a second input signal received from a second pressure transducer $P_D$ (146) connected the conduits at a location 148 downstream of the inlet valve to be monitored, representing the current gas pressure downstream of the monitored inlet valve. From the input from the downstream pressure transducer $P_D$, the controller compares a current gas pressure downstream ($P_D$) with a desired delivery pressure. If the current downstream pressure is greater than or equal to the desired delivery pressure, the simple inlet valve remains closed. If the downstream pressure is lower than desired, the controller momentarily opens the inlet valve, releasing added oxygen into the downstream portion of the oxygen distribution system and raising the downstream pressure.

Within this embodiment, the inlet valve could be opened for an interval that is constant for each opening event, and the delivery would then be controlled solely by adjusting the duration of the time between pulses. Alternatively, both the length of the opening interval and the duration of the closed time between intervals could be each adjusted to achieve the overall result. Since oxygen flows out of the system through the breathing devices, the pressure at the point where the downstream pressure is measured would vary somewhat as a function of time, dropping continuously when the inlet valve is closed and increasing continuously when the inlet valve is opened. The magnitude of the contained volume of the system downstream, relative to the volume rate of flow out of the system, would affect the magnitude of such variations. By suitably varying the time scale of the on and off intervals, the output pressure can be adjusted to suitably approximate a steady state.

Many oxygen systems for aircraft passengers utilize as the oxygen dispensing device the type of constant flow oxygen mask that is known as a "phase dilution mask." Such masks are contemplated by SAE Aerospace Standard AS8025. The mask has a reservoir that collects oxygen delivered during the portions of the breathing cycle when the user is exhaling and during the pause between breaths, and this collected oxygen is then delivered at the beginning of the next inhalation. If the time scale of the variation in delivery pressure is short relative to the time scale of the breathing cycle, the output pressure would be considered to be approximating a steady state in a manner suitable for the purpose of supplying such a mask.

Thus, in the seventh embodiment of the invention, a simple inlet valve such as a two position solenoid valve can replace a more complicated and costly control valve. In association with this change in valve type, the controller is also correspondingly simpler because it is only required to generate a simple "on" or "off" signal. This configuration also allows for a zoned-system architecture, with one or more pressure controllers and their corresponding sources of supplemental breathable oxygen, inlet valves, breathing devices and cabin air pressure transducers placed in various locations within the aircraft.

Figure 10:
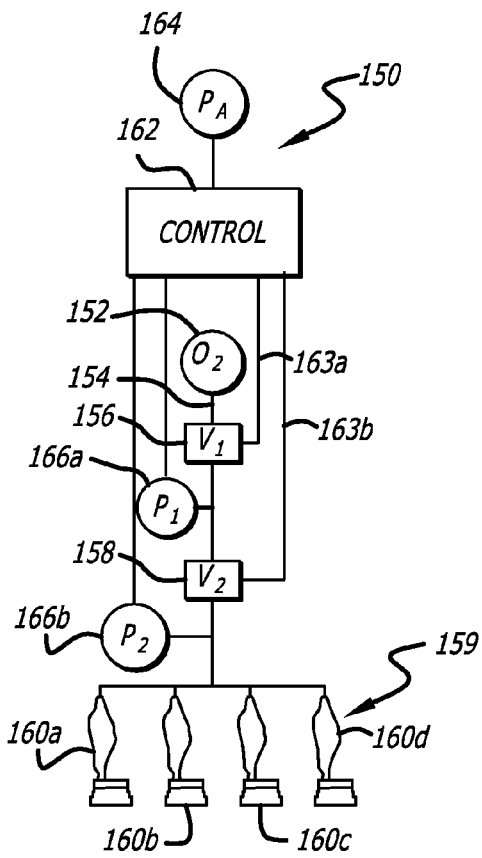
FIG. 10 is a schematic diagram of a eighth embodiment of the system for regulating the dispensing of commercial aircraft passenger oxygen supply, according to the present invention.

In an eighth embodiment of the invention illustrated in FIG. 10, multiple simple inlet valves are placed at various locations within the oxygen distribution piping system, with a pressure transducer downstream of each inlet valve. In this embodiment, the emergency oxygen supply system 150 includes a source of supplemental breathable oxygen 152, such as one or more cylinders of compressed oxygen, for example, which serves to store a required supply of oxygen. A conduit 154 is connected to the source of supplemental breathable oxygen to provide a flow of oxygen, controlled by a first relatively simple upstream on-off inlet valve $V_1$ (156), and a second relatively simple downstream on-off inlet valve $V_2$ (158), such as a two-position solenoid valve, for example, connected serially to a set 159 of breathing devices 160a, 160b, 160c, typically including one or more individual reservoir bags and attached face masks. A single pressure controller 162 is connected to the inlet valves and controls the operation of the inlet valves via control lines 163a, 163b in response to input signals received from a first pressure transducer $P_A$ (164), representing the cabin pressure and a corresponding altitude, input signals received from a second pressure transducer $P_1$ (166a), downstream from the upstream on-off valve $V_1$, and a third pressure transducer $P_2$ (168a), downstream from the downstream on-off valve $V_2$, representing the current gas pressure downstream of the monitored valves. Each valve and associated pressure transducer set is connected to the controller by a separate set of wires. The controller may have multiple independent channels, so that each valve and associated pressure transducer has a dedicated control channel. Alternatively, the controller could be sequenced so that the signal from one downstream pressure transducer at a time is read, and its associated valve is pulsed if the pressure value detected is low enough to require this action.

In this embodiment, oxygen delivery pressure can be set to an optimum value zone by zone, without performance being limited by the differences in flow rates at various locations in the piping network that result from variations in pressure drops within different regions of the piping network. This configuration also allows for a zoned-system architecture, with one or more pressure controllers and their corresponding sources of supplemental breathable oxygen, inlet valves, breathing devices and cabin air pressure transducers placed in various locations within the aircraft.

Figure 11:
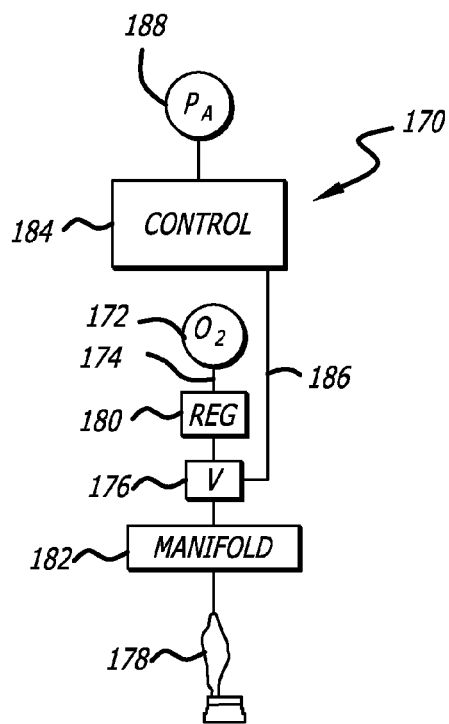
FIG. 11 is a schematic diagram of a ninth embodiment of the system for regulating the dispensing of commercial aircraft passenger oxygen supply, according to the present invention.

In a ninth embodiment of the invention, illustrated in FIG. 11, an emergency oxygen supply system 170 includes a source of supplemental breathable oxygen 172, such as one or more oxygen cylinders. In the limiting case of such an approach, each cabin occupant may be served by a separate one-person cylinder. A conduit 174 is connected to the source of supplemental breathable oxygen to provide a flow of oxygen, controlled by a relatively simple on-off inlet valve 176, such as a two-position solenoid valve, for example, to an individual breathing device 178, typically including a reservoir bag and an attached face mask. Such one-person, small oxygen cylinders and associated apparatus for the emergency oxygen supply system can be distributed throughout the passenger cabin area of an airplane. Each oxygen vessel is fitted with a simple pressure reducing regulator 180, with no altitude-compensating features included. Downstream of the inlet valve, a manifold 182 is interposed between the inlet valve and its associated reservoir bag.

A single pressure controller 184 is connected to and controls the operation of the inlet valve via a control line 186 in response to a first input signal received from a single pressure transducer $P_A$ (188), representing the cabin pressure and a corresponding altitude. The controller evaluates the pressure transducer signal and generates a single signal to the simple inlet valve. In this case, there is an intrinsic flow rate that would be achieved through each dispensing orifice if the simple inlet valve were to be continuously open. This intrinsic flow rate is a function of the output pressure from the pressure reducer and the properties of the dispensing orifices. Depending on the flow that is appropriate for the given altitude, the valve-operating signal is applied for a suitable fraction of the operating time. The flow rate achieved by the dispensing orifice is then equal to the intrinsic flow rate possible multiplied by the fraction of time the inlet valve is open. For example, if the intrinsic flow rate possible when the inlet valve is open continuously is 4 liters per minute and the valve is open 30% of the time, the flow rate achieved is 1.2 liters per minute. This configuration also allows for a zoned-system architecture, with one or more pressure controllers and their corresponding sources of supplemental breathable oxygen, inlet valves, breathing devices and cabin air pressure transducers placed in various locations within the aircraft.

Figure 12:
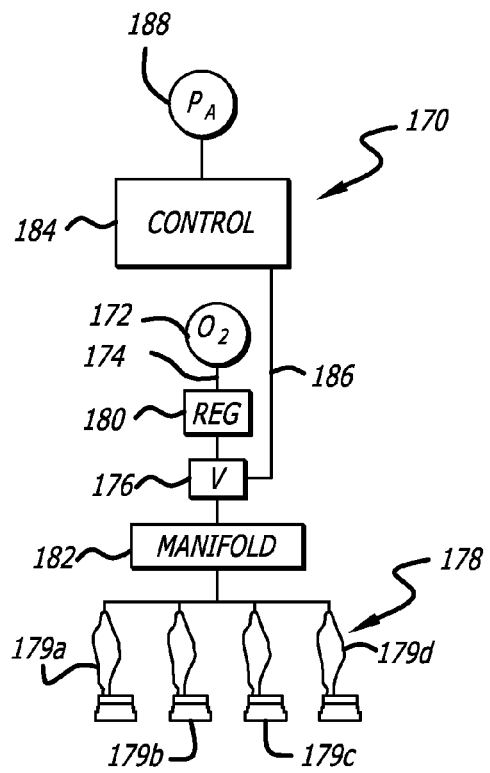
FIG. 12 is a schematic diagram of a variation of the ninth embodiment of FIG. 11.

As is illustrated in FIG. 12, in a variation of the ninth embodiment, in which the same elements from FIG. 11 are indicated by the same reference numbers as in FIG. 11, more than one cabin occupant may be served by each source of supplemental oxygen 172 of the emergency oxygen supply system 170. A conduit 174 is connected to the source of supplemental breathable oxygen to provide a flow of oxygen, controlled by a relatively simple on-off inlet valve 176, such as a two-position solenoid valve, for example, to a set 178 of breathing devices 179a, 179b, 179c, 179d, each typically including one or more individual reservoir bags and attached face masks. Each oxygen vessel is fitted with a simple pressure reducing regulator 180 with no altitude-compensating features included. Downstream of the inlet valve, a manifold 182, fitted with one or more dispensing orifices, is interposed between the inlet valve and its associated reservoir bag. Each manifold orifice typically supplies more than one oxygen mask. A single pressure controller 184 is connected to and controls the operation of the inlet valve via a control line 186 in response to a first input signal received from a single pressure transducer $P_A$ (188), representing the cabin pressure and a corresponding altitude. This configuration also allows for a zoned-system architecture, with one or more pressure controllers and their corresponding sources of supplemental breathable oxygen, inlet valves, breathing devices and cabin air pressure transducers placed in various locations within the aircraft.

Figure 13:
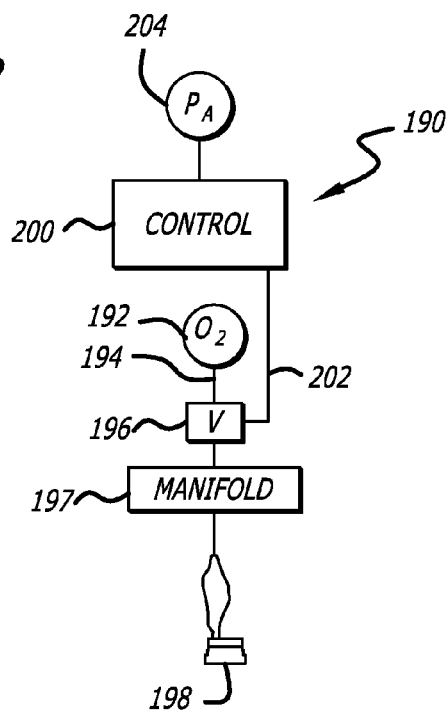
FIG. 13 is a schematic diagram of a tenth embodiment of the system for regulating the dispensing of commercial aircraft passenger oxygen supply, according to the present invention.

In a tenth embodiment of the invention, illustrated in FIG. 13, an emergency oxygen supply system 190 includes a source of supplemental breathable oxygen 192, such as a relatively small oxygen cylinder. Such one-person, small oxygen cylinders and associated apparatus for the emergency oxygen supply system can be distributed throughout the passenger cabin area of an airplane. As is shown in FIG. 13, each cabin occupant may be served by a separate one-person cylinder, although more than one person may be served by each oxygen supply cylinder, as is further described below. A conduit 194 is connected to the source of supplemental breathable oxygen to provide a flow of oxygen, controlled by a relatively simple on-off inlet valve 196, such as a two-position solenoid valve, for example, to an individual breathing device 198, typically including a reservoir bag and an attached face mask. In this embodiment, a pressure reducer at the outlet of the local oxygen vessel is eliminated. Downstream of the inlet valve, a manifold 197 is interposed between the inlet valve and its associated reservoir bag.

A single pressure controller 200 is connected to the inlet valve and controls the operation of the inlet valve via a control line 202 in response to an input signal received from a single pressure transducer $P_A$ (204), representing the cabin pressure and a corresponding altitude. The controller evaluates the pressure transducer signal and generates a signal to the simple inlet valve. In this case, there is an intrinsic flow rate that would be achieved through each dispensing orifice if the simple inlet valves were continuously open. This intrinsic flow rate is a function of the output pressure from the pressure reducer and the properties of the dispensing orifices. Depending on the flow that is appropriate for the given altitude, the valve-operating signal is applied for a suitable fraction of the operating time. The flow rate achieved by each dispensing orifice is then equal to the intrinsic flow rate possible multiplied by the fraction of time the inlet valve is open. For example, if the intrinsic flow rate possible when the inlet valve is open continuously is 4 liters per minute and the inlet valve is open 30% of the time, the flow rate achieved is 1.2 liters per minute. This configuration also allows for a zoned-system architecture, with one or more pressure controllers and their corresponding sources of supplemental breathable oxygen, inlet valves, breathing devices and cabin air pressure transducers placed in various locations within the aircraft.

Figure 14:
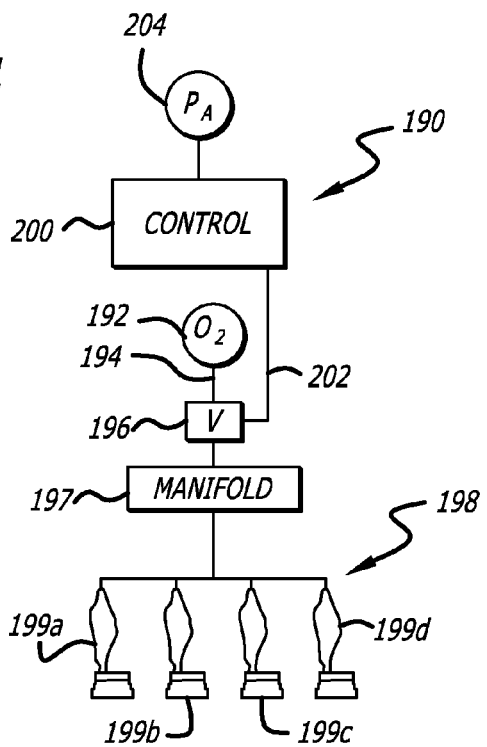
FIG. 14 is a schematic diagram of a variation of the tenth embodiment of FIG. 13.

As is illustrated in FIG. 14, in a variation of the tenth embodiment, in which the same elements from FIG. 13 are indicated by the same reference numbers as in FIG. 13, more than one cabin occupant may be served by each source of supplemental breathing oxygen 192 of the emergency oxygen supply system 190. A conduit 194 is connected to the source of supplemental breathable oxygen to provide a flow of oxygen, controlled by a relatively simple electrical on-off inlet valve 196, such as a two-position solenoid valve, for example, to a corresponding set 198 of breathing devices 199a, 199b, 199c, 199d, typically including one or more individual reservoir bags and attached face masks, respectively. Downstream of the inlet valve, a manifold 197, fitted with one or more dispensing orifices, is interposed between the inlet valve and its associated reservoir bag. A single pressure controller 200 is connected to the inlet valve and controls the operation of the inlet valve via a network of control lines 202 in response to a first input signal received from a single pressure transducer $P_A$ (204) representing the cabin pressure and a corresponding altitude. An intrinsic flow rate can be achieved at any given point in time through each dispensing orifice when the simple inlet valve is open continuously. However, this flow rate changes as the pressure in the oxygen storage vessel upstream of the dispensing orifice decays with the passage of time during operation of the equipment. The flow rate is a function of the operating time history and the pressure decay properties of the oxygen storage unit, as well as the properties of the dispensing orifices themselves. In this context, the "operating time" refers to the time the valve remains open, which is not necessarily equal to the total elapsed time since the beginning of a decompression incident causing supplemental oxygen to be used. This configuration also allows for a zoned-system architecture, with one or more pressure controllers and their corresponding sources of supplemental breathable oxygen, inlet valves, breathing devices and cabin air pressure transducers placed in various locations within the aircraft.

The single pressure transducer senses the cabin pressure altitude. The controller contains information that mathematically describes the way in which the pressure in the oxygen storage vessel decays as a function of operating time. The controller also measures and retains information about the operating time history during the period of use. The controller evaluates the pressure transducer signal and the operating time history and generates a single signal to the simple inlet valve. Depending on the flow that is appropriate for the combination of given altitude and given previous operating time history, the valve-operating signal is applied for a suitable fraction of the operating time. The flow rate achieved by each dispensing orifice is then equal to the intrinsic flow rate possible multiplied by the fraction of time the valve is open.

As an illustrative example, assume that the cabin pressure altitude is such that it is desired to deliver a flow rate of 2 liters per minute. Initially, the combination of contained pressure within the cylinder and the orifice characteristics would allow a flow of 5 liters per minute if the valve were open continuously. Because appropriate data are stored in the controller, the controller initially opens the valve 40% of the time, resulting in an appropriate 2 liter per minute flow rate. After some period of operating time has elapsed, the contents within the cylinder are partially discharged, lowering the contained pressure to an extent that a flow of 3 liters per minute would be possible if the valve were continuously open. By tracking the history of how long the valve has been open and using this stored information in combination with other stored information about the properties of the equipment, the controller can calculate that this condition prevails. The controller then opens the valve 67% of the time to continue delivering a flow rate of 2 liters per minute.

In many gaseous oxygen systems, at the start of operation a surge of oxygen is delivered for a few seconds to provide sufficient pressure to operate pneumatic latches that release the doors of the compartments where the oxygen masks are stowed prior to need. It will be apparent that within the teachings of this invention such a surge could be provided by the controller if desired.

Another way of opening the doors of the compartments is by an electrical latch. Usually, power for the latch circuit would be supplied independently of the power supplied to the electrical valves used in my invention. However, the electrical latches could be wired into the same circuit as these valves. In that case, the latches would draw power each time the valve was powered. This added power consumption might be an acceptable trade-off for elimination of the weight associated with the wires of a second power circuit for the latches.

A latch may also be equipped with a feature such that energizing the latch to release the doors also performs an action that opens a contact within the latch, interrupting continuity through the latch so that the latch cannot draw power again until a contact position is reset. In this case, the latch draws power needed to release the door only the first time the circuit is energized, but the door latch does not draw power when subsequent power pulses are applied to the circuit. A suitable series-parallel circuit would permit the valve to continue to operate without continuity through the latch.

In many oxygen systems, some redundant components are sometimes installed to enhance the overall system reliability. This practice could be followed within the scope of my invention. For example, although the embodiments as described above have mentioned the use of a single pressure transducer to sense cabin altitude pressure, adding a second redundant transducer would lie within the intended scope of my invention. Similarly, the use of wiring arrangements that provide redundant connections to protect against possible deactivation of the equipment due to damage to the wiring would lie within the intended scope of my invention.

It will be apparent from the foregoing that, while particular forms of the invention have been illustrated and described, various modifications can be made without departing from the spirit and scope of the invention. Accordingly, it is not intended that the invention be limited, except as by the appended claims.

The invention claimed is:

1. An emergency oxygen supply system for an aircraft with a pressurizable passenger cabin comprising:
   a source of supplemental breathable oxygen;
   a conduit connected to said source of supplemental breathable oxygen;
   an upstream first on-off inlet valve connected to said conduit downstream from said source of supplemental breathable oxygen;
   a downstream second on-off inlet valve connected to said conduit downstream serially from said first on-off inlet valve;
   a plurality of breathing devices connected to said conduit downstream from said downstream second on-off inlet valve;
   at least one cabin air pressure transducer for generating a cabin air pressure input signal representing the cabin pressure and a corresponding altitude;
   a second pressure transducer connected to said conduit between said upstream first on-off inlet valve and said downstream second on-off inlet valve, and a third pressure transducer connected to said conduit between said second on-off inlet valve and said plurality of breathing devices, said second and third pressure transducers being configured to sense a gas pressure in said conduit at locations downstream of the first and second on-off inlet valves, respectively; and
   a pressure controller connected to said at least one cabin air pressure transducer for receiving said cabin air pressure input signal, said pressure controller being connected to and controlling the operation of said first and second on-off inlet valves in response to said cabin air pressure input signal received from said at least one cabin air pressure transducer, and said pressure controller being operative to control the operation of said first and second on-off inlet valves in response to said second and third pressure transducers, respectively.

2. The emergency oxygen supply system of claim 1, wherein said inlet valve comprises a two-position solenoid valve.

3. An emergency oxygen supply system for an aircraft with a pressurizable passenger cabin comprising:
   a plurality of sources of supplemental breathable oxygen;
   a corresponding plurality of conduits connected to said plurality of sources of supplemental breathable oxygen, respectively;
   a corresponding plurality of upstream first on-off inlet valves connected to said corresponding plurality of conduits, respectively, and a corresponding plurality of downstream second on-off inlet valves, connected to said corresponding plurality of conduits downstream serially from said plurality of first on-off inlet valves, respectively;
   a corresponding plurality of sets of pluralities of breathing devices connected to said corresponding plurality of conduits downstream from said plurality of downstream second on-off inlet valves, respectively;

at least one cabin air pressure transducer for generating a cabin air pressure input signal representing the cabin pressure and a corresponding altitude;

a plurality of second pressure transducers connected to said corresponding plurality of conduits between said plurality of upstream first on-off inlet valves and said plurality of downstream second on-off inlet valves, respectively, and a plurality of third pressure transducers connected to said corresponding plurality of conduits between said plurality of downstream second on-off inlet valves and said corresponding plurality of sets of pluralities of breathing devices, respectively, said plurality of second pressure transducers being configured to sense a gas pressure in said corresponding plurality of conduits between said plurality of upstream first on-off inlet valves and said plurality of downstream second on-off inlet valves, respectively, and said plurality of third pressure transducers being configured to sense a gas pressure in said corresponding plurality of conduits between said plurality of second on-off inlet valves and said corresponding plurality of sets of pluralities of breathing devices, respectively; and a pressure controller connected to said at least one cabin air pressure transducer for receiving said cabin air pressure input signal, said pressure controller being connected to and controlling the operation of said plurality of upstream first on-off inlet valves and said plurality of downstream second on-off inlet valves in response to said cabin air pressure input signal received from said at least one cabin air pressure transducer, and said pressure controller being operative to control the operation of said plurality of upstream first on-off inlet valves and said plurality of downstream second on-off inlet valves in response to said second and third pressure transducers, respectively.

* * * * *